(12) United States Patent
Olivier et al.

(10) Patent No.: US 7,469,653 B2
(45) Date of Patent: Dec. 30, 2008

(54) STREAMER CONNECTION SYSTEM

(75) Inventors: André W. Olivier, River Ridge, LA (US); Christian J. Christensen, Harahan, LA (US); Lloyd Joseph LaCour, Jr., Sequim, WA (US)

(73) Assignee: ION Geophysical Corporation, Houston, TX (US)

( * ) Notice: Subject to any disclaimer, the term of this patent is extended or adjusted under 35 U.S.C. 154(b) by 0 days.

(21) Appl. No.: 11/669,650

(22) Filed: Jan. 31, 2007

(65) Prior Publication Data
US 2008/0181717 A1 Jul. 31, 2008

(51) Int. Cl.
B63G 8/14 (2006.01)
(52) U.S. Cl. ....................................... 114/245
(58) Field of Classification Search .................. 114/245
See application file for complete search history.

(56) References Cited

U.S. PATENT DOCUMENTS

| | | | |
|---|---|---|---|
| 3,648,642 A | | 3/1972 | Fetrow et al. |
| 3,757,370 A | * | 9/1973 | Seno et al. ................. 441/133 |
| 3,931,608 A | | 1/1976 | Cole |
| 4,711,194 A | | 12/1987 | Fowler |
| 4,879,719 A | | 11/1989 | Dumestre, III |
| 5,214,612 A | | 5/1993 | Olivier et al. |
| 5,278,804 A | | 1/1994 | Halvorsen |
| 5,507,243 A | | 4/1996 | Williams et al. |
| 5,529,011 A | | 6/1996 | Williams, Jr. |
| 5,619,474 A | | 4/1997 | Kuche |
| 5,709,497 A | | 1/1998 | Zoch et al. |
| 6,034,923 A | | 3/2000 | Wooters |
| 6,091,670 A | | 7/2000 | Oliver et al. |
| 6,263,823 B1 | | 7/2001 | Olivier |

* cited by examiner

Primary Examiner—Jesús D Sotelo
(74) Attorney, Agent, or Firm—James T. Cronvich

(57) ABSTRACT

A connection system for connecting external devices to specified locations on a marine seismic streamer. Inner collars are clamped to the cable at specified locations along its length. Each inner collar forms a circular race encircling the cable. An outer collar attached to an external device rotatably receives the inner collar and the encircled streamer in its bore to allow the streamer to rotate freely within the outer collar relative to the external device. The outer collar has an inner face bounding and defining the shape of the bore. The inner face is tapered from an intermediate position outward toward front and rear edges of the outer collar to form a bore that is wider at the front and rear edges than at the intermediate position. This flaring out of the bore provides the streamer three degrees of angular freedom to position itself within the bore. Roller bearings, such as ball bearings or pin bearings, retained in recesses in the collar opening onto the inner face at the intermediate position extend into the bore to provide a low-friction bearing surface to the inner race. The ball bearings are retractable against spring pressure to provide the streamer with two degrees of lateral freedom to translate itself within the bore. In a typical connection system, a single external device is connected to the streamer by a pair of associated inner and outer collars.

36 Claims, 8 Drawing Sheets

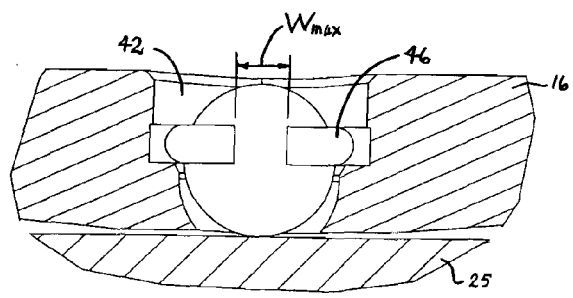
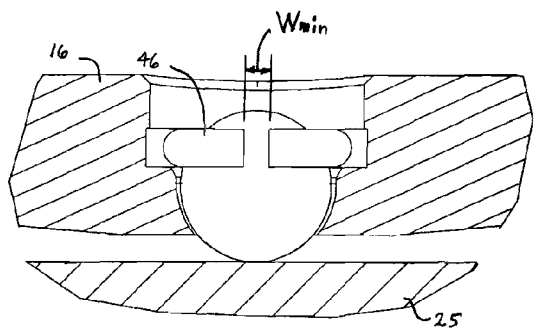
FIG. 7A    FIG. 7B
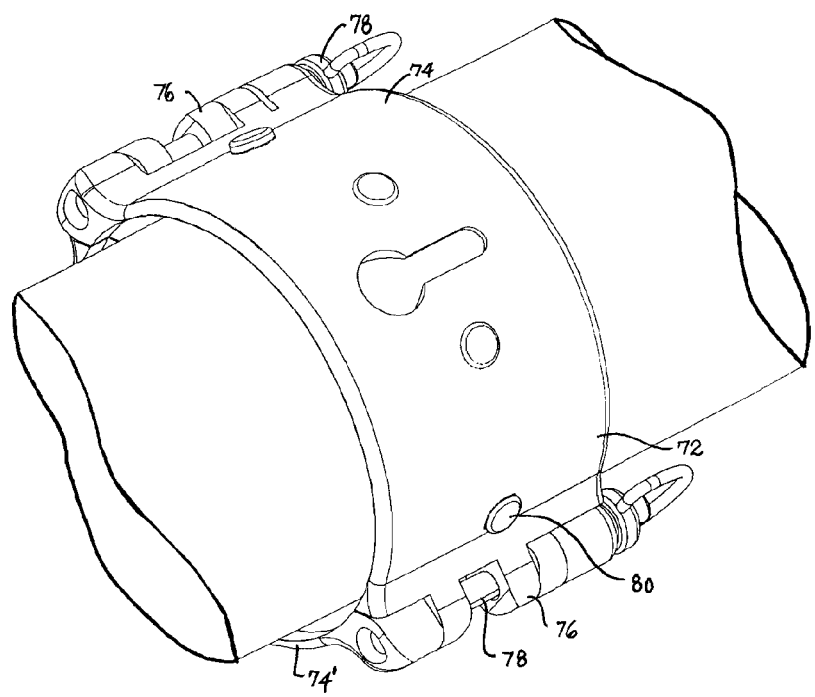
FIG. 15

STREAMER CONNECTION SYSTEM

BACKGROUND

This invention relates to marine seismic prospecting and, more particularly, to a connection system for attaching equipment to seismic streamers.

A marine seismic streamer is a cable, typically several thousand meters long, that contains arrays of hydrophones and associated electronic equipment along its length. One purpose of the streamer is to position the hydrophone array at a known depth and position relative to a towing vessel in a survey area. Externally mounted equipment, such as depth controllers, called "birds," lateral-position controllers, emergency recovery pods, and acoustic pods, performs the functions of positioning and controlling the cable.

Individual external devices are attached to the streamer at various positions along its length. In one conventional streamer connection system, a collar arrangement uses a hinge and latch mechanism for operation. Examples of this kind of system are described in U.S. Pat. No. 5,507,243, "Connector For Underwater Cables," Apr. 16, 1996, to Oneil J. Williams et al. and in U.S. Pat. No. 5,709,497, "Latching Device," Jan. 20, 1998, to David W. Zoch et al. Another conventional connection system uses C-shaped collars that slip radially onto the cable and slide axially into position. Examples of this system are described in U.S. Pat. No. 6,263,823, "Connection System for Connecting Equipment to Underwater Cables," Jul. 24, 2001, to André W. Olivier. The C-shaped collars dispense with the need for hinges and latches. All these kinds of outer collars, with external devices attached, are attached around inner collars affixed to the cable as the cable is payed out from the back deck of a survey vessel. Circular cylindrical inner surfaces on the outer collars ride on races formed on the exterior of the inner collars. This allows the streamer to rotate inside the outer collars without also rotating the external devices.

In a typical arrangement, an external device is connected to the streamer at both a fore and an aft position. In most circumstances, the stiffness of the streamer under the tension of the tow maintains the section of streamer between the fore and aft positions straight. In the case of a bird or other external device having a heading sensor referenced to the center line passing through the centers of the two outer collars, maintaining a parallel relationship between the streamer's axis and the collars' center line is important in deriving an accurate indication of the heading of the streamer at the location of the sensor. But, at slow tow speeds when streamer tension drops or in the face of high lateral forces caused by external lateral steering devices, the section of streamer between the fore and aft collars can bend and twist out of a straight alignment. The action of the streamer can also force the fore and aft collars out of alignment, their centerline offset or angled relative to the streamer's axis. This misalignment causes uncorrectable errors in the heading sensor reading. Furthermore, the twisting and bending of the streamer can cause the inner collars to bind in the outer collars, which hinders the free rotation of the cable within the outer collars relative to the attached external device, whose performance is consequently compromised.

SUMMARY

These and other shortcomings are overcome by a streamer connection system having features of the invention. In one aspect, a connection system comprises a pair of inner collars having axial bores for receiving a streamer. The inner collars are affixed to the streamer at spaced apart locations along its length. Two outer collars rotatably receive the pair of inner collars in axial bores. Each outer collar has a front edge and an opposite rear edge and an inner face defining the axial bore in which the associated inner collar is received. An external device is attached to the outer collars. The bores of the outer collars flare out to the front and rear edges from an intermediate position between the two edges.

In another aspect of the invention, a connector for connecting external devices to a streamer comprises a collar that is attachable to an external device. The collar has an inner face shaped to define an axial bore that widens in opposite directions from a narrowmost intermediate waist for receiving a streamer and providing clearance to allow the streamer to change its angular orientation within the axial bore.

In still another aspect of the invention, a connector for connecting cable-positioning devices to a streamer comprises a collar attachable to a cable-positioning device. The collar has a front edge and an opposite rear edge that define the length of the collar and an inner face that defines a bore for receiving a streamer. The inner face is tapered from the front edge toward the rear edge and from the rear edge toward the front edge so that the bore flares out from an intermediate position along the length of the collar to the front edge and from the intermediate position to the rear edge.

In yet another aspect of the invention, a connector for connecting cable-positioning devices to a streamer comprises a collar that is attachable to a cable-positioning device. The collar has a front edge and an opposite rear edge defining the length of the collar. An inner face of the collar defines a bore for receiving a streamer. A low-friction bearing disposed circumferentially around the inner face extends into the bore at an intermediate position between the front and rear edges. The low-friction bearing is preferably realized as a ring of ball bearings.

BRIEF DESCRIPTION OF THE DRAWINGS

These features and aspects of the invention, as well as its advantages, are better understood by referring to the following description, appended claims, and accompanying drawings in which:

FIGS. 7A and 7B are enlarged views of a ball bearing portion of an outer collar as in FIG. 5, showing the ball bearing in retracted and extended positions;

FIG. 15 is an isometric view of yet another version of outer collar having a hinge and a latch mechanism and usable in a streamer connection system as in FIG. 1.

DETAILED DESCRIPTION

Figure 1:
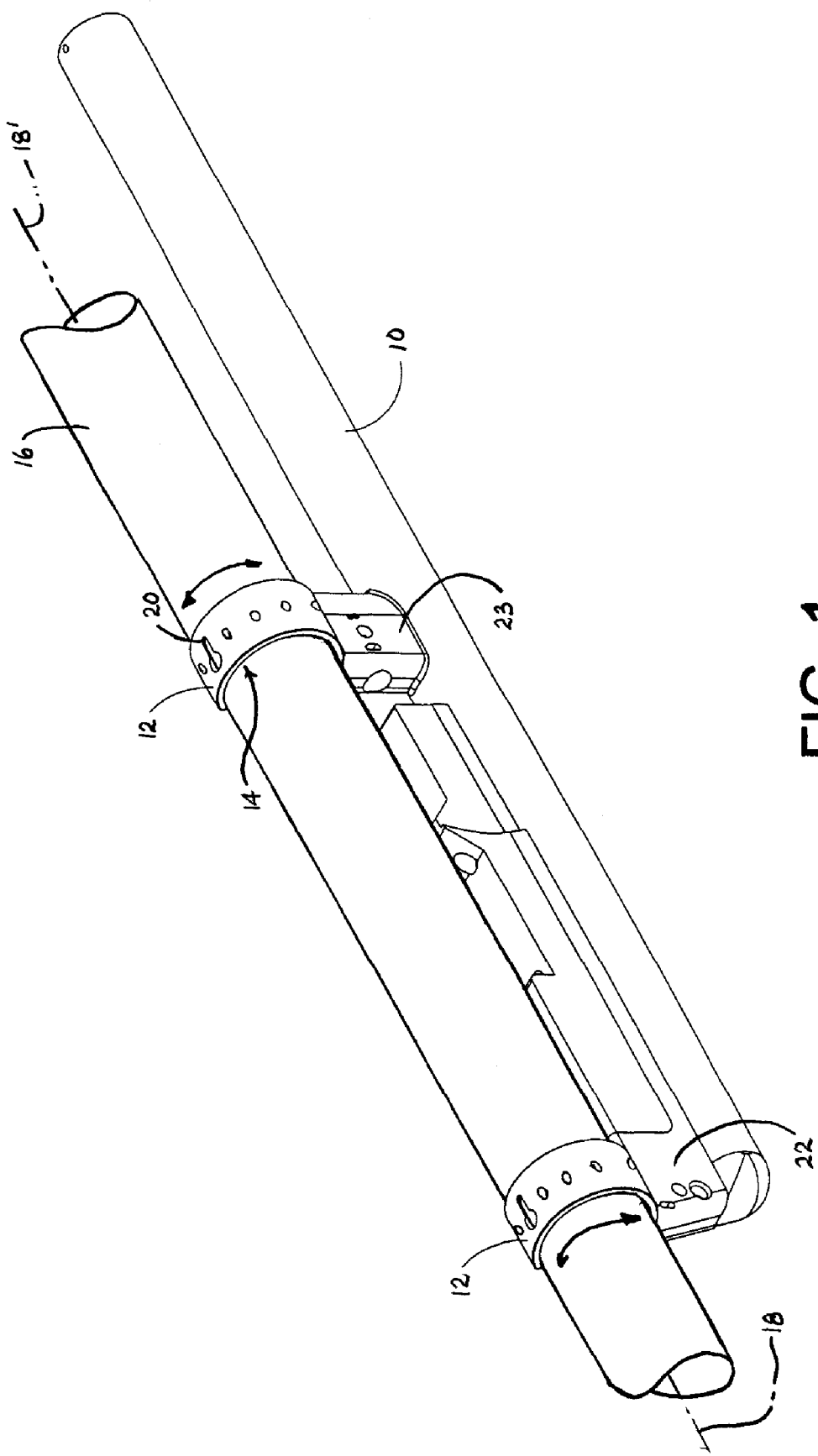
FIG. 1 is an isometric view of a streamer connection system embodying features of the invention.
Figure 2:
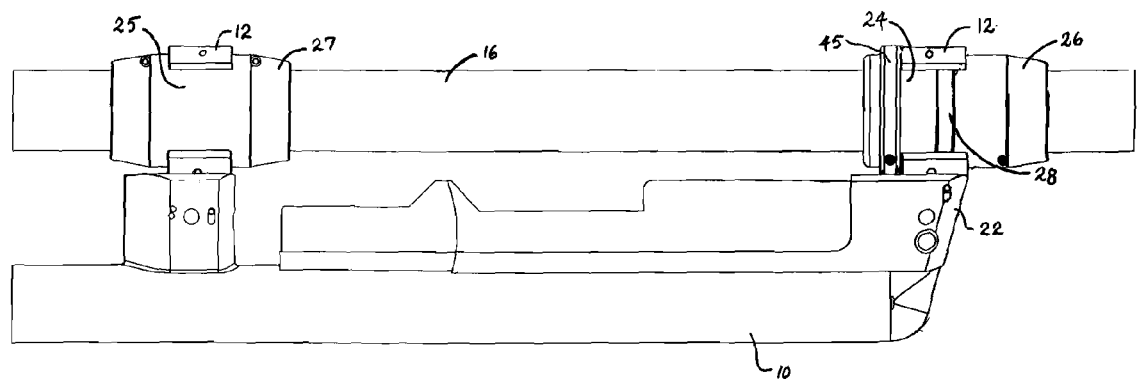
FIG. 2 is a side elevation view showing further details of the streamer connection system of FIG. 1.
Figure 3:
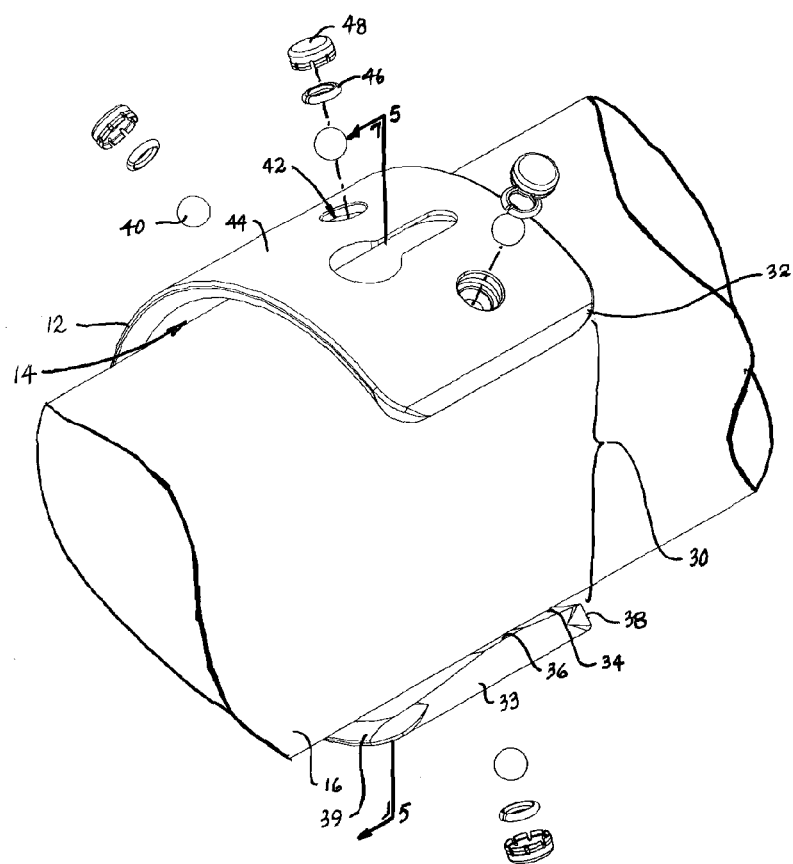
FIG. 3 is an exploded isometric view of an outer collar usable in the streamer connection system as in FIG. 1.

A connection system embodying features of the invention for connecting external devices to a streamer is shown in FIGS. 1-3. An external device 10, such as a cable-leveling bird, a cable-steering device, an acoustic transceiver, or a velocimeter, is attached at two positions to outer collars 12. The outer collars, which are preferably made of a strong, light material such as titanium or a titanium alloy, have central bores 14 sized to receive a streamer 16. In a preferred condition, the axes 18, 18' of the bores coincide, and the streamer section between the two outer collars is straight and coaxial with the bores. The external device is attached to the outer collars with pins (not shown) that extend outward from fore and aft pylons 22, 23 to engage keyways 20 formed in the collars at diametrically opposite positions.

As better shown in FIG. 2, the outer collars 12 actually ride on races 24, 25 formed on the periphery of inner collars 26, 27 clamped around the streamer 16 at spaced apart locations along its length. The inner collars are preferably made of a hard plastic material. A retractable latch pin (not shown) extends outward of the fore pylon 22 into a circumferential groove 28 in the periphery of the forward inner collar to retain the outer collar in position on the inner collar. The outer collars are free to move about the streamer on the races of the inner collars. In this way, the external device can maintain a constant radial position relative to the streamer axis as the streamer rotates in the bores of outer collars. The attachment of external devices to the outer collars and the rotational engagement of the outer collars with the inner collars are described in more detail in U.S. Pat. No. 6,263,823, which is incorporated into this description by reference.

The outer collar 12 shown in FIG. 3 is C-shaped with an opening 30 between opposite ends 32, 33 of the collar. The opening is wide enough to allow the collar to be slipped radially onto the streamer 16. (Once the streamer is received in the outer collar's bore, the outer collar can be slid axially onto an inner collar to assume the position shown in FIG. 2.) The size of the opening is less than the diameter of the bore 14 to provide an inner face 34 that extends circumferentially through an arc of between 180° and 360°.

Figure 4:
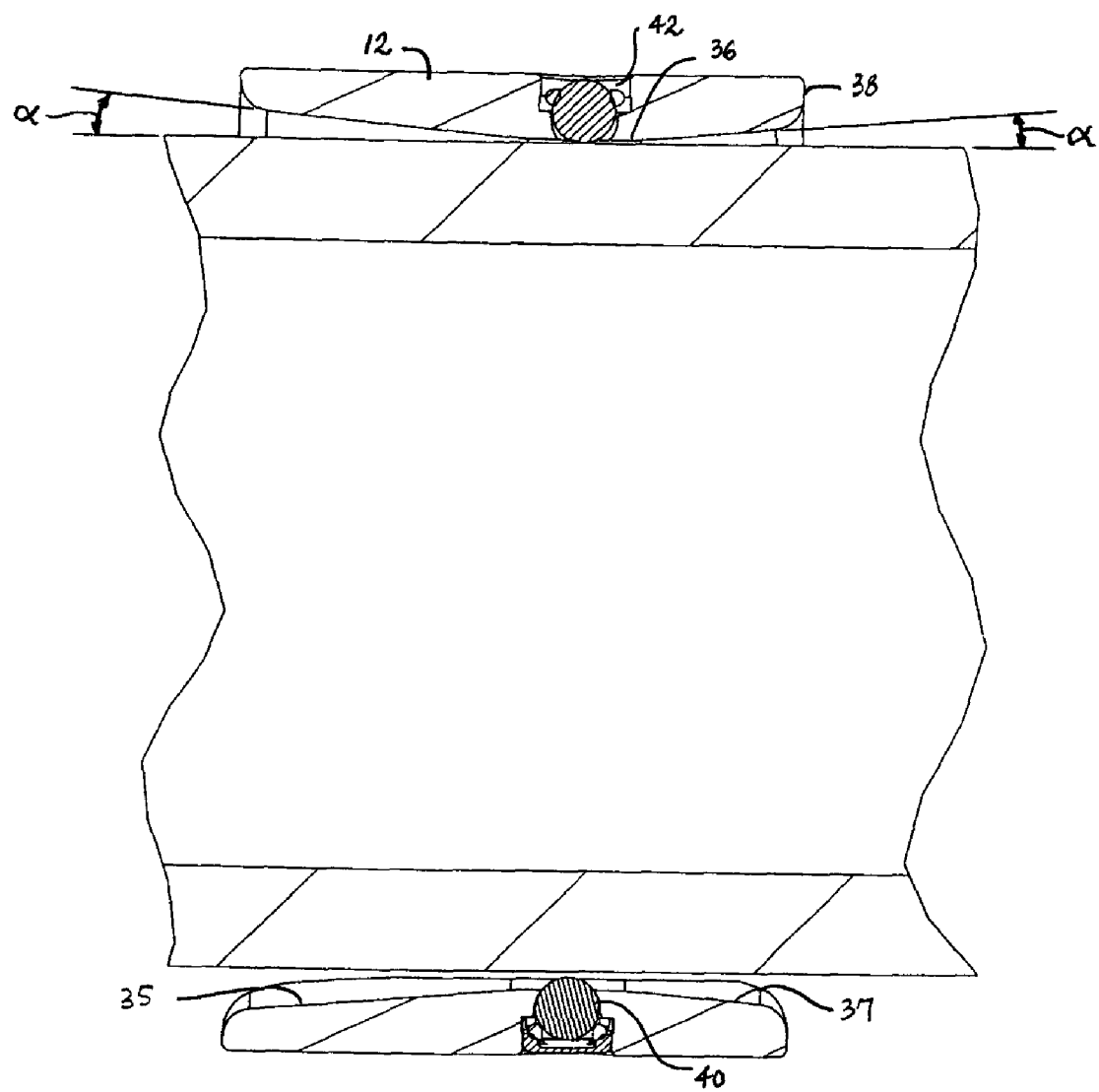
FIG. 4 is a cross section of the streamer connection system of FIG. 2 taken along lines 4-4.
Figure 5:
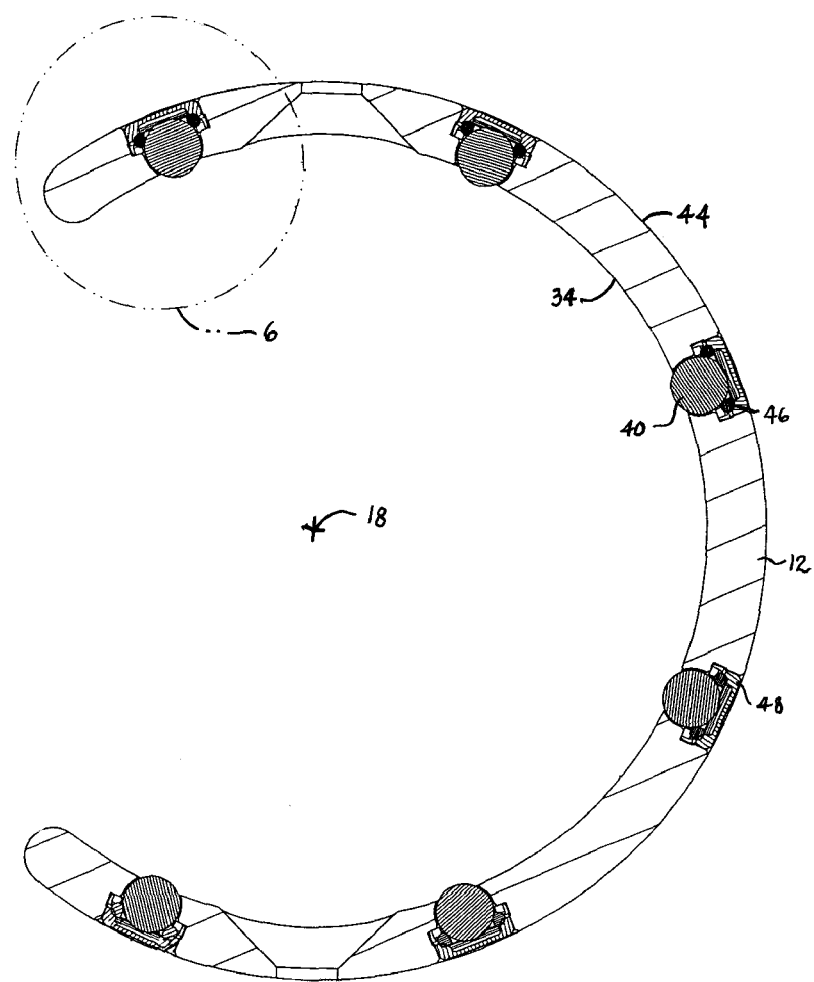
FIG. 5 is a cross section of the outer collar of FIG. 3 taken along lines 5-5.
Figure 6:
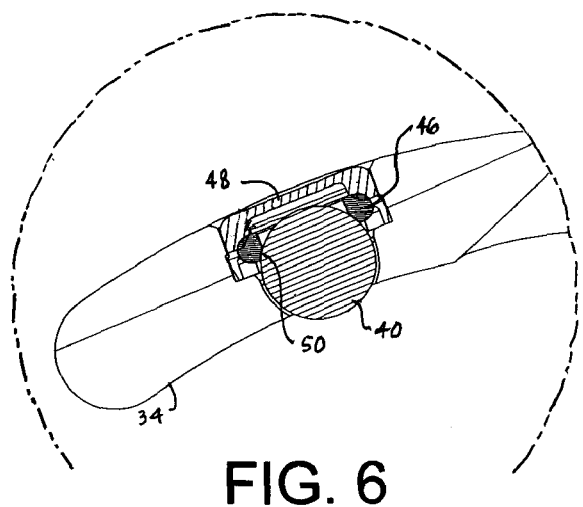
FIG. 6 is an enlarged view of a portion of the outer collar of FIG. 5.

As best shown in FIGS. 3 and 4, the inner face 34, which defines the shape of the bore, is tapered from an intermediate position 36 in the axial direction to front and rear edges 38, 39. The angle α of the taper in any cross section is preferably greater than the maximum deflection of the cable under expected operation conditions. Thus, the bore has a somewhat hourglass shape with a narrowmost waist at the intermediate position and flares out in both directions, like back-to-back truncated cones, along front and rear tapered regions 35, 37 on the inner face to wider mouths at the opposite edges.

As shown in FIGS. 3-6, roller bearings, such as ball bearings 40, extend into the bore from recesses 42 opening onto the inner face 34. In this example, six recesses are circumferentially spaced around the outer collar 12 on equal intervals. The recesses also open onto the outer periphery 44 of the collar. The ball bearings, which are preferably made of a ceramic material for hardness, durability, and corrosion resistance, sit in seats 46 in the recesses. Caps 48, press-fit into the recesses from the periphery of the collar, retain the ball bearings within their seats in the recesses. The caps may be made of a non-corrosive material, such as plastic or titanium. The seats, which are split rings preferably made of a plastic material, have contoured interior seat portions 50 contacting the ball bearings. The force of the inner collar 25 of the streamer against the salient portion of a ball bearing 40 protruding into the outer collar's bore pushes the ball bearing into a retracted position within the recess 42 as shown in FIG. 7A. In this fully retracted position, the ball bearing pushes the split-ring seat 46 open as the ball is forced deeper into the recess. The split in the ring reaches its maximum width $W_{max}$ when the ball is in its fully retracted position. If the streamer applies little or no force against the ball bearing, the ball assumes a fully extended position as shown in FIG. 7B. The resilient plastic seat acts as a spring biasing the ball bearing toward the bore as the seat assumes its normal state. When the force against the ball from the streamer decreases, the split in the seat closes as the ball is pushed out farther into the bore until it bottoms out in the recess. In this fully extended position of the ball bearing, the split in the seat is at its minimum width $W_{min}$. Because the arrays of ball bearings ringing the inner faces of the collars along their waists bear against the streamer's inner collars in low-friction rolling contact and because the ball bearings can assume a range of depths in the bores between the fully retracted and fully extended positions, they give the streamer two degrees of freedom to adjust its position within the bore. This will correct any small, but not necessarily insignificant, offset between the axis of the streamer at the front collar position and the axis of the streamer at the rear collar position. Thus, the self-adjusting ball bearings allow the streamer to easily seek an aligned position within the bores of the two collars connected to the external device.

Figure 14:
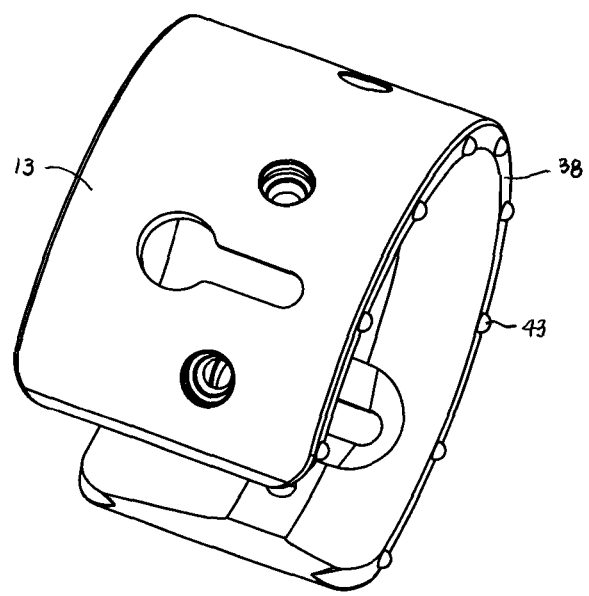
FIG. 14 is an isometric view of an outer collar as in FIG. 3 further including thrust bearings.

A variation of the outer collar is shown in FIG. 14. In this version, an outer collar 13 includes thrust bearings in the form of small ball bearings 43 protruding from cavities opening onto the rear edge 38 of the collar. The thrust bearings could alternatively or additionally be positioned in the front edge of the collar. The balls may be seated on seats similar to those already described. The thrust bearings are useful, for example, in providing low-friction, rolling contact with the enlarged-diameter stop 45 formed on the fore inner collar 26 in FIG. 2.

Figure 8:
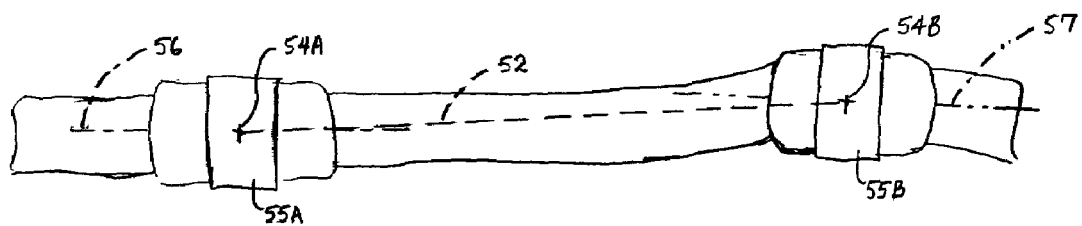
FIG. 8 is a representation of a prior art streamer connection system subjected to streamer distortion.

FIG. 8 shows, in two dimensions, how a conventional streamer connection system, in which the inner face is not tapered, can cause a misalignment between the line 52 passing through the centers 54A, 54B of fore and aft outer collars 55A, 55B and the axes of the streamer 56, 57 at the collars. This misalignment of the axes and the center line causes problems. First, an external device including a heading sensor is conventionally arranged with its lubber line parallel to the line 52 passing through the centers of the outer collars connecting the external devices to the streamer. Consequently, if the referenced line 52 does not represent the local orientation of the streamer, the heading reading used to define the orientation of the cable at the external device having the sensor will be erroneous. Second, the bends in the streamer between the two collars can cause the outer collars to bind in the races of the inner collars. This binding interferes with the free rotation of the inner collars within the outer collars and can cause the external devices to corkscrew with the streamer as it is towed through the water.

Figure 9:
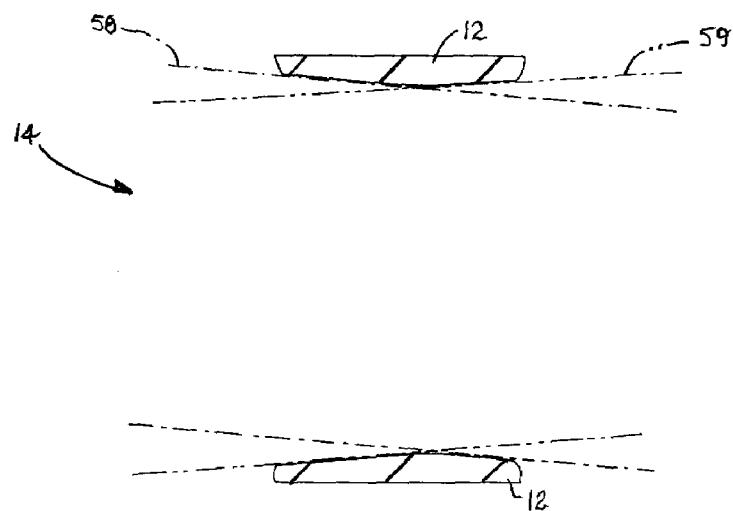
FIG. 9 is a diagram illustrating the freedom of motion provided to a streamer by the outer collar of FIG. 3.

To overcome these problems, the outer collars are tapered as previously described. FIG. 9 shows, in a side elevation cross section, how the tapers permit the streamer to adjust its angle through the bore 14 of the outer collar 12 over a range of angles represented by the difference between the orientations of a first streamer 58 and a second streamer 59. Of course, the two-dimensional representation of FIG. 9 depicts only two degrees of freedom provided by the tapered inner face of the collar, when, in fact, the cylindrical collar provides a solid angle and three degrees of angular freedom for the streamer through the collar. The three degrees of angular freedom afforded by the tapering of the inner faces of the collars, together with the two degrees of lateral freedom provided by the retractable ball bearings, ensure that the reference line of the external devices remains parallel to the tangent line to the centerline of the streamer section between the two collars connecting the external device to the cable. Furthermore, the freedom of the streamer to adjust its orientation through the collars ensures free rotation of the streamer relative to the external device by preventing binding of the streamer in the outer collars.

Figure 10:
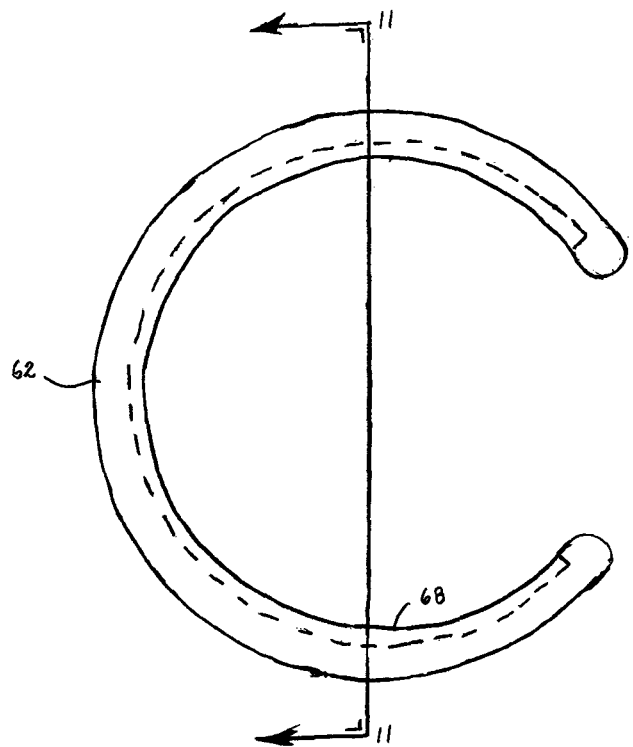
FIG. 10 is a front elevation view of another version of outer collar usable in a streamer connection system as in FIG. 1 and having a continuous ball-bearing track.
Figure 11:
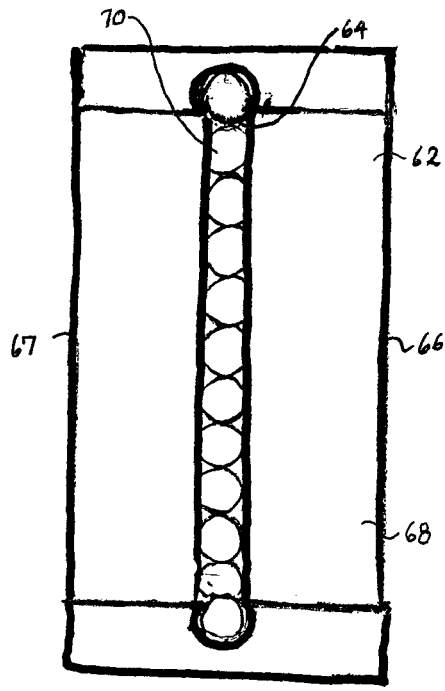
FIG. 11 is a cross section of the outer collar of FIG. 10 taken along lines 11-11.
Figure 12:
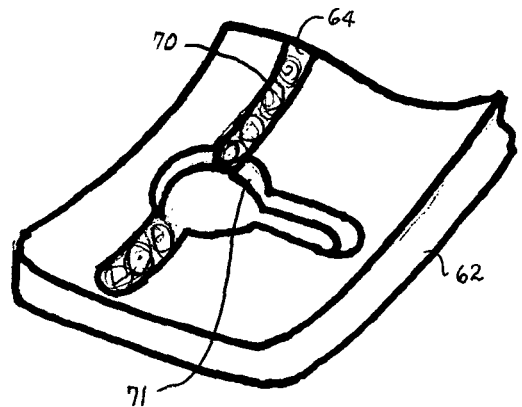
FIG. 12 is a partial view of an end of the outer collar of FIG. 10 illustrating an attachment keyway leading to the ball-bearing track.

Another version of the outer collar is shown in FIGS. 10-12. In this version, the outer collar 62 has an undercut track 64 that runs circumferentially around the collar between front and rear edges 66, 67. The track opens onto an inner face 68 of the collar. Ball bearings 70 fill the track and protrude outward into the collar's bore 72 as a low-friction bearing engaging an inner race clamped to a streamer. The balls are inserted into the track through the side of a keyway 71 into which the track opens. The keyway is used as well to attach external devices to the collar. Although the collar is shown with an untapered inner face, it could be made with a tapered inner face to provide the streamer with more degrees of freedom. Conversely, the inner collar of FIG. 3, which has individual, spaced apart ball-bearing recesses, could be made without the taper if the angular degrees of freedom provided by the taper are not necessary.

Figure 13:
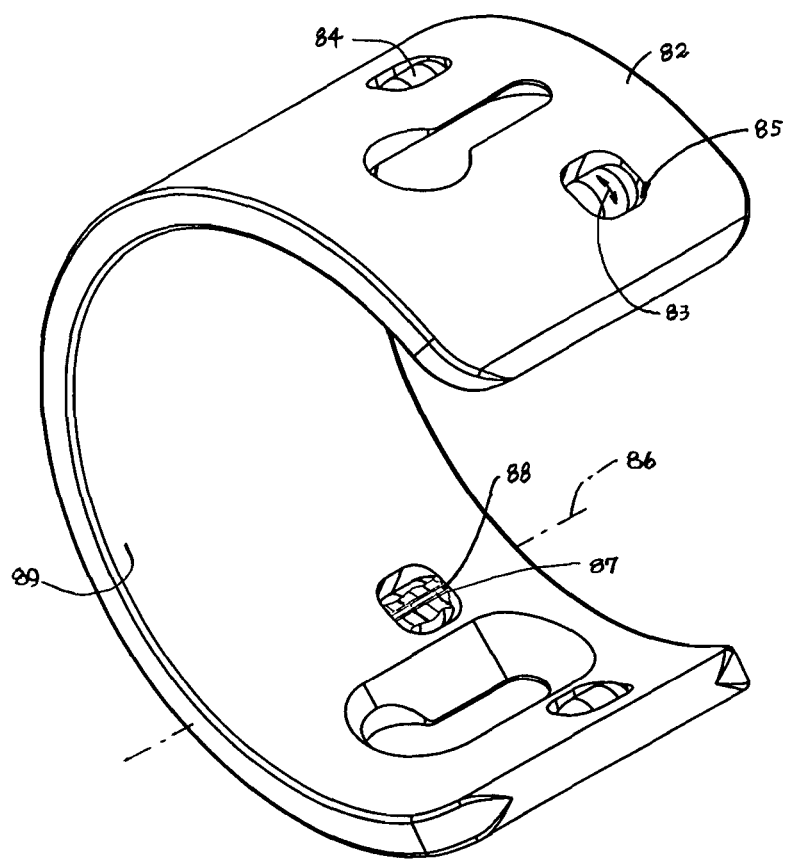
FIG. 13 is an isometric view, partly cut away, of another version of outer collar having pin bearings and usable in a streamer connection system as in claim 1.

Yet another version of the outer collar is shown in FIG. 13. The collar 82 uses pin bearings 84 as roller bearings. The pin bearings are arranged in collar recesses 85 to rotate 83 on axes 86 parallel to the streamer axis. A bore 87 through the center of each pin bearing journals a pivot pin 88 spanning the recess to retain the pin bearing in the collar and define its axis of rotation. The generally cylindrical pin bearings are shaped to extend into the collar's bore. The inner face 89 of the outer collar is shown untapered, but could be tapered as the inner collar of FIG. 4.

Still another version of outer collar is shown in FIG. 15. The clamshell collar 72 includes two half shells 74, 74' connected together at hinges 76 with retractable latch pins 78. One or the other latch pin is pulled out of its hinge to allow the clamshell to open by pivoting at the other hinge for installation onto or removal from the streamer. When the collar is installed on the streamer, both latch pins are fully inserted, as shown in FIG. 15. When closed, the collar extends circumferentially 360° to completely encircle the streamer. Like the other versions of outer collars, this collar can include individual ball bearings in individual recesses and covered with caps 80 as shown or ball bearings in a continuous track as in FIG. 11. Furthermore, the inner face of the outer collar of FIG. 15 could be tapered or untapered.

Although the invention has been described in detail with reference to a few preferred versions, other versions are possible. For example, any of the outer collars with tapered inner faces could be made without a low-friction bearing. As another example, the taper on the inner face was shown as a linear taper, but the taper could be stepped or curvilinear. As another example, the number of ball bearings and recesses shown in FIG. 5 could be greater or less than six. And the balls could be arranged in two or more rows and staggered, for example. As yet another example, the front and rear tapered regions could have different tapers. As another example, the thrust bearings could be pin bearings protruding from the edge of the outer collar. So, as these few examples suggest, the scope of the claims is not meant to be limited to the preferred versions.

What is claimed is:

1. A connector for connecting external devices to a streamer, the connector comprising a collar having an outer periphery with attachment means for attaching an external device to the outer periphery and having an inner face shaped to define an axial bore widening in opposite directions from a narrowmost intermediate waist for receiving a streamer and providing clearance to allow the streamer to change its angular orientation within the axial bore.

2. A connector as in claim 1 further comprising a low-friction bearing retained in the collar and extending into the bore at the waist to contact the streamer.

3. A connector as in claim 2 wherein the low-friction bearing comprises a plurality of roller bearings retained in the collar and protruding into the bore at the waist.

4. A connector as in claim 3 wherein the roller bearings are spaced apart circumferentially around the waist.

5. A connector as in claim 3 wherein the roller bearings are made of a ceramic material.

6. A connector as in claim 3 wherein the collar includes a circumferential recess opening onto the inner face along the waist, wherein the roller bearings are retained in the recess and protrude through the inner face and into the bore.

7. A connector as in claim 3 wherein the collar comprises a plurality of recesses opening onto the inner face at circumferentially spaced locations around the waist, wherein each of the recesses receives one of the roller bearings protruding through the inner face and into the bore.

8. A connector as in claim 7 wherein the roller bearings are ball bearings and further comprising a self adjusting seat for the ball bearing in each of the recesses providing the ball bearing play to adjust the depth of the ball bearing's protrusion into the bore in response to forces applied to the ball bearing by the streamer.

9. A connector as in claim 3 wherein the roller bearings are ball bearings and further comprising a plurality of spring-biased seats retained in the collar, wherein each ball bearing sits on one of the seats and is biased toward the bore by the spring-biased seat.

10. A connector as in claim 9 wherein the spring-biased seat is a split ring.

11. A connector as in claim 7 wherein the roller bearings are pin bearings.

12. A connector as in claim 11 further including pins aligned parallel to the axial bore of the collar and spanning the recesses and wherein the pin bearings have central bores journaling the pins.

13. A connector as in claim 1 wherein the inner face of the collar extends circumferentially 360°.

14. A connector as in claim 1 wherein the inner face of the collar extends circumferentially between 180° and 360°.

15. A connection system for connecting external devices to a streamer, the connection system comprising:

a first inner collar having an axial bore receiving a streamer, wherein the first inner collar is coaxially affixed to the streamer at a first location along the length of the streamer;

a second inner collar having an axial bore receiving the streamer, wherein the second inner collar is coaxially affixed to the streamer at a second location along the length of the streamer;

a first outer collar having a front edge and an opposite rear edge and an inner face defining an axial bore for rotatably receiving the first inner collar;

a second outer collar having a front edge and an opposite rear edge and an inner face defining an axial bore for rotatably receiving the second inner collar;

an external device attached to the first and second outer collars;

wherein the bores of the first and second outer collars flare out to the front and rear edges from an intermediate position between the front and rear edges.

16. A connection system as in claim 15 wherein the first and second outer collars include a plurality of roller bearings retained in the outer collars and protruding into the bores of the outer collars at the intermediate positions.

17. A connection system as in claim 16 wherein the roller bearings are spaced apart circumferentially along the inner faces of the outer collars.

18. A connection system as in claim 16 wherein the first and second outer collars include a plurality of recesses opening onto the inner faces at circumferentially spaced locations, wherein the recesses receive the roller bearings protruding through the inner faces and into the bores of the outer collars.

19. A connection system as in claim 18 wherein the roller bearings are ball bearings and further comprising a self-adjusting seat for the ball bearing in each of the recesses providing the ball a range of radial positions in the recess.

20. A connection system as in claim 18 wherein the roller bearings are ball bearings and further comprising a plurality of spring-biased seats retained in the recesses, wherein the ball bearings sit on one of the seats and are biased toward the bores by the spring-biased seats.

21. A connection system as in claim 18 wherein the roller bearings are pin bearings arranged to rotate on axes parallel to the axial bore.

22. A connection system as in claim 15 wherein the inner faces of the first and second outer collars are linearly tapered from the intermediate position to the front and rear edges.

23. A connection system as in claim 15 further comprising thrust bearings disposed along at least one of the front and rear edges of at least one of the first and second outer collars.

24. A connector for connecting cable-positioning devices to a streamer, the connector comprising:

a collar having an outer periphery with attachment means for attaching a cable-positioning device to the outer periphery and having a front edge and an opposite rear edge defining the length of the collar and having an inner face defining a bore for receiving a streamer;

wherein the inner face is tapered from the front edge toward the rear edge and from the rear edge toward the front edge so that the bore flares out from an intermediate position along the length of the collar to the front edge and from the intermediate position to the rear edge.

25. A connector as in claim 24 wherein the collar comprises a plurality of roller bearings retained in the collar and protruding into the bore at the intermediate position.

26. A connector as in claim 25 wherein the roller bearings are spaced apart circumferentially along the inner face.

27. A connector as in claim 25 wherein the collar comprises a plurality of recesses opening onto the inner face at circumferentially spaced locations, wherein each of the recesses receives one of the roller bearings protruding through the inner face and into the bore.

28. A connector as in claim 27 wherein the roller bearings are ball bearings and further comprising split rings disposed in the recesses to serve as seats for the ball bearings.

29. A connector as in claim 27 wherein the roller bearings are pin bearings.

30. A connector as in claim 29 further including pins aligned parallel to the bore of the collar and spanning the recesses and wherein the pin bearings have central bores journaling the pins.

31. A connector system as in claim 24 further comprising thrust bearings protruding from at least one of the front and rear edges of the collar.

32. A connector for connecting cable-positioning devices to a streamer, the connector comprising:

a collar attachable to a cable-positioning device and having a front edge and an opposite rear edge defining the length of the collar and having an inner face defining a bore for receiving a streamer;

a low-friction bearing disposed circumferentially around the inner face and extending into the bore at an intermediate position between the front and rear edges.

33. A connector as in claim 32 wherein the low-friction bearing comprises a plurality of roller bearings retained in the collar and protruding into the bore at the intermediate position.

34. A connector as in claim 33 wherein the roller bearings are spaced apart circumferentially along the inner face.

35. A connector as in claim 32 wherein the inner face is tapered from the intermediate position outward to the front edge and to the rear edge to provide a bore that is wider at the front and rear edges than at the intermediate position.

36. A connector system as in claim 32 further comprising thrust bearings protruding from at least one of the front and rear edges of the collar.

* * * * *